Patented Mar. 17, 1953

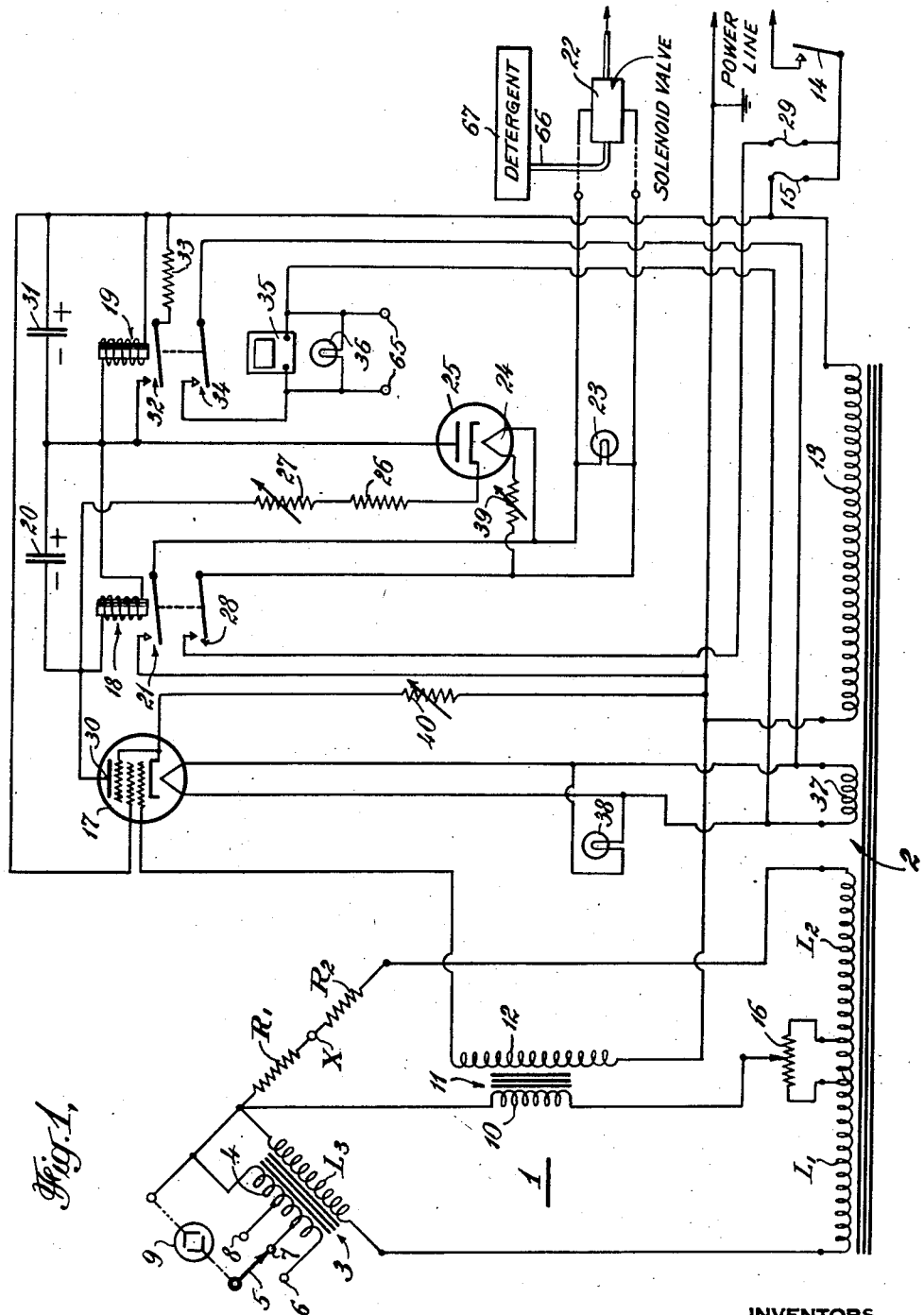

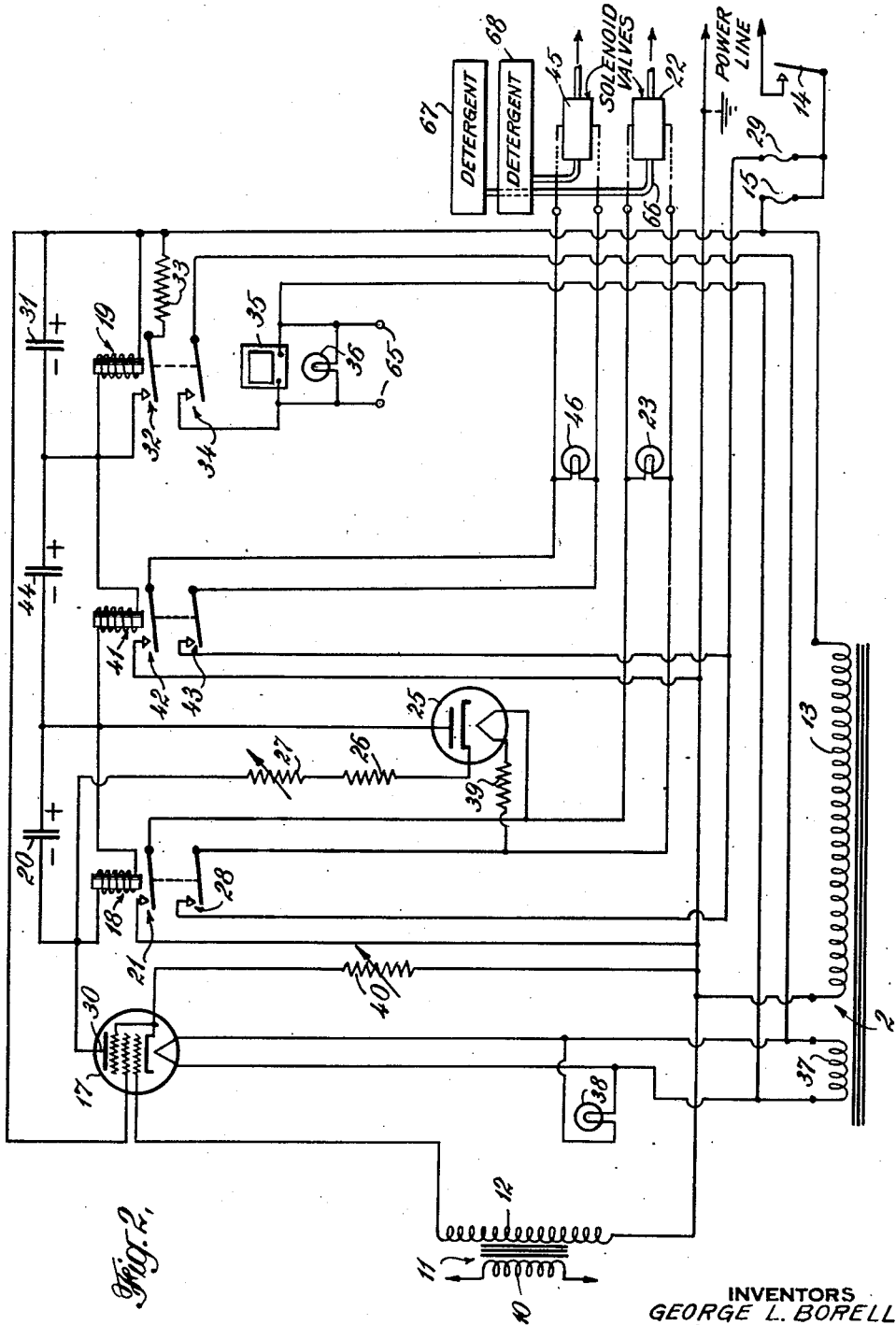

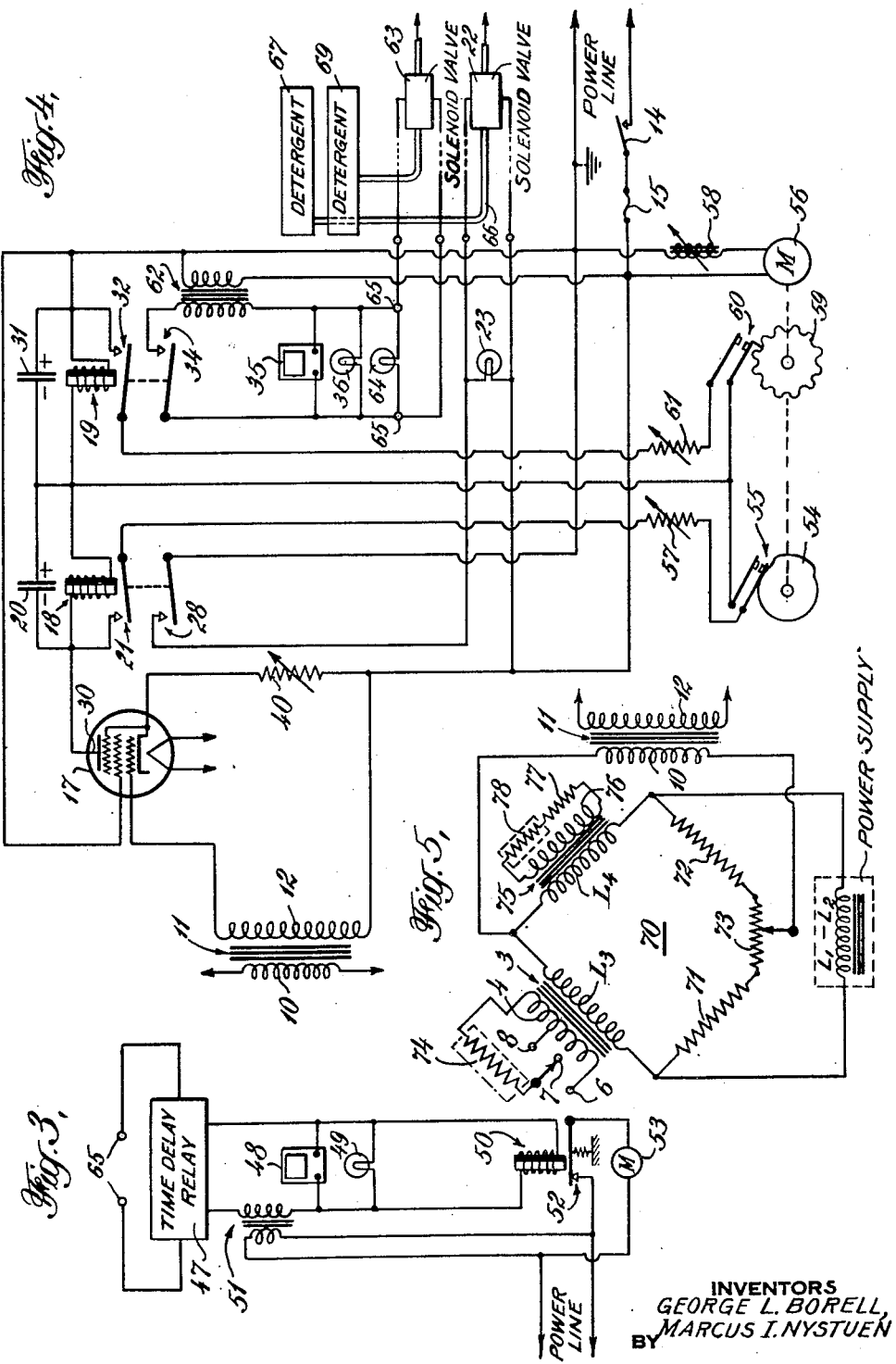

2,632,144

UNITED STATES PATENT OFFICE 2,632,144

TEMPERATURE AND CONCENTRATION RESPONSIVE CONTROL SYSTEM

George L. Borell, Minneapolis, and Marcus I. Nystuen, St. Paul, Minn., assignors to Economics Laboratory, Inc., St. Paul, Minn., a corporation of Delaware Application March 17, 1949, Serial No. 81,856

9 Claims. (Cl. 323—69)

This invention relates to control and signal systems, and especially to those in which a condition or an operation must be controlled within close limits. Although the invention has a wide variety of applications, it is particularly adapted to control the concentration of solutions and the like.

Equipment which utilizes cleansing solutions such as detergents, as in dishwashing machines for example, preferably includes apparatus which is intended automatically to maintain the solution concentration at a predetermined value. Apparatus heretofore proposed for this purpose has included a conductivity cell which is immersed in the solution and to which are connected electrical circuits controlling the feed of detergent to the solution. Such apparatus has not been entirely satisfactory, chiefly because the control system was (1) insufficiently sensitive, (2) slow in response, (3) subject to an inertia effect causing it to overcorrect the given condition and (4) was responsive to an undesirably restricted range of solution concentrations. The apparatus of the present invention overcomes all of the mentioned disadvantages of the prior systems and yet is simple, readily adjusted, and reliable under severe service conditions. Also, it is adapted to the control of the concentration of solutions of different electrical characteristics and to use with pickup devices or sensing elements of various types having different electrical characteristics.

The present application for patent is directed more especially to a balanced network or bridge as employed for coupling the pickup device, such as a conductivity cell, to the control system proper. Such network includes in one arm an inductance or transformer having a tapped winding by which the transformer turns ratio can be adjusted so as to permit sensitive balancing of the same bridge when used with pickup devices of a variety of electrical characteristics, especially of resistance and capacitive reactance. U. S. Letters Patent No. 2,525,016, granted October 10, 1950 on application of George L. Borell, filed May 3, 1949, which is a division of the present application, is directed to the control system, per se.

The nature of the invention will be clear from the following description considered in connection with the drawings, wherein:

Fig. 1 is a circuit diagram of a complete control and signal system including a compensating coupling network in accordance with the invention;

Fig. 2 is a circuit diagram of a modification of the system of Fig. 1 which includes provisions for additional controls and signals;

Fig. 3 illustrates an auxiliary signal and control circuit which may be combined with those of any of the other figures to provide further indications and automatic control operations in the event that the prior signals and controls have been ignored or have proved inadequate;

Fig. 4 is a circuit diagram of an alternative embodiment of the system of Fig. 1 employing mechanical means for pulsing the sensing control and signal circuits; and Fig. 5 is a diagram of a sensing circuit and compensating coupling network adapted for use in a temperature control system according to the invention.

Fig. 1 is the wiring diagram of a preferred form of control and signal system of the invention which includes three fundamental portions, a balanceable bridge network, a relay control portion, and the several elements subject to the control. The bridge network 1 illustrated at the left of the drawing comprises essentially four arms, two of which comprise the inductance portions $L_1$, $L_2$ of a power transformer 2, the third arm $L_3$ of which comprises the primary winding of a compensating and impedance matching transformer 3, and the fourth arm of which comprises resistance. The secondary 4 of transformer 3 is preferably tapped, or otherwise arranged so that the conductivity cell which is to be connected thereto can be connected at points of different inductance values for the purpose later to be described. To this end a switch 5 is arranged to contact points 6, 7 and 8 on secondary 4. Connecting means are provided to connect to the selected portion of secondary 4 a conductivity cell 9 which fundamentally may comprise two electrodes insulated from each other and arranged to be immersed in the solution, the concentration of which it is desired to control. It is preferable, in accordance with the invention, that this cell include temperature compensating means so that change in temperature of the solution will not appreciably affect the balance of the bridge, since, in the application of the invention described by way of example, it is the solution concentration rather than the temperature which is intended to be controlled. A novel form of conductivity cell, especially adapted for use in connection with the present invention is described and claimed in our copending application Serial No. 71,418, filed January 18, 1949, Patent No. 2,560,209, granted July 10, 1951.

It will be evident that the fundamental system of the invention is adaptable to the control of temperature, as well as other characteristics and conditions in general, in which event the detecting or signal pickup element connected into the bridge network at the $L_3$ arm would be of appropriate type and design.

The fourth arm of the bridge network includes resistors $R_1$ and $R_2$, of which resistor $R_1$ in the present embodiment comprises the temperature compensating resistor above referred to which is included in the conductivity cell. Resistor $R_2$ may conveniently comprise an additional variable element. The actual values of resistors $R_1$ and $R_2$ are not here suggested because they would ordinarily depend on the electrical characteristics of the cell 9.

Across one pair of conjugate points of the bridge network is connected the primary 10 of an output coupling transformer 11, having a secondary winding 12. One of the conjugate points to which primary 10 is effectively connected includes a potentiometer 16, the resistor element of which is connected across an appropriate number of central turns of the secondary inductance $L_1$—$L_2$. The resistance of potentiometer 16 may conveniently be of a value of 50 ohms and be connected across a portion of the mentioned secondary winding which represents about 6 volts. This potentiometer constitutes a titration control, the purpose of which will be later explained. The other pair of conjugate points effectively comprise the extreme terminals of the inductances $L_1$ and $L_2$ by means of which power is impressed on the bridge network. For this purpose transformer 2 has a primary winding 13 which, in turn, is connectible through power switch 14 and fuse 15 to a power line here assumed to be of 120 volts, 60 cycles alternating current.

The secondary winding 12 of bridge output transformer 11 is connected to the control grid and cathode, respectively, of a suitable amplifying tube 17, such as type 6V6, for example. The primary and secondary windings 10, 12 of transformer 11 should have impedance values appropriate to couple the indicated circuit elements. In the present instance, a ratio of about 1 : 10 is satisfactory. This transformer also conductively isolates the bridge network from the grid of tube 17, which is necessary because that network is unavoidably grounded through the conductivity-cell electrodes and the solution in the wash tank.

The anode circuit of tube 17 includes the windings of two relays 18 and 19, respectively. These relays may be of any suitable type and for the present purposes may be substantially alike in their characteristics and construction. The relay coils may be of, say, 2500 ohms each. Relay 18 may be adjusted to be actuated by a current of about 10 milliamperes, and relay 19 may be actuated by a current of slightly more than that, as will be more clear from the description of the operation of the system. A condenser 20 is shunted across the coil of relay 18 to prevent it from chattering when used with alternating current or with pulsating direct current, which results from rectifying action of tube 17. This condenser should be of large capacity, such as 40 microfarads or more, but might be omitted if the anode circuit, were operated on direct current, which is entirely feasible although usually not so convenient. Contacts 21 and 28 of relay 18 when closed energize solenoid valve 22, or any other desired component or mechanism which it is desired to control. Resistor 40, connected in the cathode return lead of tube 17, which in this case may be of about 300 ohms, should be such that the relay 18 will be positively deactuated in the balanced condition of bridge network 1. By means of this resistor, amplifier tube 17 will operate on the steepest part of its transconductance curve. Resistor 40 also tends to minimize variations in the anode current of amplifier tube 17 which result from load variations in the anode circuit.

The solenoid valve, here shown to be connected to the control circuit by suitable means, may be assumed to control the supply of detergent to the washing tank in the washing machine so that when the valve is open detergent will flow through conduit 66 from source 67 and when it is closed the flow will cease. In the same circuit with the solenoid valve is connected a signal lamp 23 which will be lighted whenever the solenoid of this valve is energized. Also connected in this same control circuit by the closing of contacts 21 is the cathode heater 24 of diode 25. This tube, may, for example, comprise a rectifier tube of type 117Z3, although any equivalent tube, delayed-action relay, or other suitable device may be substituted. The cathode and anode of diode 25 are connected so as to form a controlled bleeder, or auxiliary, circuit which shunts the coil of relay 18 through resistors 26 and 27 one of which, here resistor 27, should be variable. These two resistors may be combined into a single unit if preferred.

The mentioned controlled bleeder circuit, which is further discussed below, is an important feature of this invention inasmuch as it makes it possible to overcome wholly, or in part, as desired, the normal differential in the operation of the relay, permitting it to be adjusted for sensitive operation at a predetermined value of anode current of tube 17 and to deactuate or open after a predetermined interval of time at the same or a different (usually greater) predetermined value of current. Fuse 29 is included in the controlled circuit to protect the circuit including elements 22 and 23 energized by the closing of contacts 21 and 28.

The second relay, 19, is connected, as shown, in series with relay 18 in the anode circuit of tube 17, viz., between the anode 30 of tube 17 and the ungrounded side of the power line. This relay 19 which is assumed to be adjusted so as to be actuated after the actuation of relay 18 in response to increase of anode current, has shunted across its winding another condenser 31 which may be similar to condenser 20. The purpose of condenser 31 is to effect the automatic pulsing of this relay so that the pulse rate will be increased with increase of anode current in the anode circuit of tube 17, until the current in the relay winding reaches an average value which is sufficient to hold the relay steadily closed. Shunt condenser 31 would be required to cause this pulsing action for either alternating-current or direct-current operation.

Closure of contacts 32 of relay 19 connects resistor 33 in shunt with condenser 31, thus tending to discharge it at a predetermined rate depending upon the value of the resistance. Closure of contacts 34 of relay 19 energizes a supplementary circuit which may be employed for any desired purpose. Here closure of these contacts actuates a warning buzzer 35 and a signal lamp or lamps 36. Signals 35 and 36 may conveniently be operated on the 6.3-volt line which is energized by the secondary winding 37 of transformer 2, used to energize the cathode heater of amplifier tube 17. Signal lamp 38 will be lighted as long as power switch 14 is closed, to indicate that the entire system is connected for operation.

ADJUSTMENT AND OPERATION

The general applicability of the invention and its many advantages will be better understood from the following description of the operation of the system of Fig. 1. For the purpose of this description it may be assumed that the system is employed to control the concentration of the detergent solution in the wash tank of a dishwashing machine. The conductivity cell 9, having been preferably secured in a wall of the wash tank or located elsewhere in the liquid system so as to be suitably immersed in the washing solution, is connected in the bridge network of Fig. 1 as shown. Under various conditions it is sometimes required to employ washing solutions of considerably different compositions and concentrations. As a result, the actual conductivity of such solutions will vary considerably, and the resistance and capacitive effects of any given conductivity cell will vary accordingly. To accommodate this situation and make possible the use of a given cell and bridge network over a wide range of operating conditions, the compensating transformer 3 is used. Were it not for the compensating transformer of the invention it would not be possible to obtain a balance of the same bridge network with the same conductivity cell over such a wide range of capacitance and resistance. To adapt the network to the required range, one of the taps, 6, 7 and 8 on secondary winding 4 of the compensating transformer may be selected. The turns ratios between these taps and winding $L_3$ is likely to be quite critical, and in the present example may be assumed to be step-down ratios of 1.45 to 1, 1.8 to 1, and 2.3 to 1, respectively (or the reciprocal primary to secondary step-up ratios), with an impedance of primary winding $L_3$ of about 145 ohms. If another type of sensing element, such as the temperature-sensitive detecting element of Fig. 5, be employed, corresponding but probably different ratios would be required. The electrical characteristics of the cell 9 will govern these values to a large extent. Accordingly, adjustment of the inductance value of secondary 4 of transformer 3 will substantially compensate the capacitive effect of the cell electrodes connected in series therewith with a considerable variety of solution characteristics. Such compensation of capacitive reactance by inductive reactance not only tends to maintain substantial electrical symmetry of the bridge network, but also reduces or minimizes phase displacement and thus retains the effectiveness of the detected signal. The slider on potentiometer 16, which for convenience we have called a "titration control," adjusts the effective balance point of the bridge. Consequently, adjustment of control 16 determines within very close limits the degree of concentration of the solution which is automatically maintained by the system of the invention.

It being assumed that the apparatus is energized by closure of power switch 14 and that the bridge network has been balanced with the conductivity cell immersed in the solution of desired concentration, the anode current of tube 17 will then be too small to actuate either of relays 18 or 19. When the concentration of the solution decreases, as occurs in normal operation of the machine, the balance of the bridge network will be destroyed to a degree proportional to the dilution of the solution. When the anode current is increased sufficiently to actuate relay 18, contacts 27 and 28 will immediately close. The current at which the relay is actuated and, therefore, the concentration of the diluted solution at which it is desired that more detergent should be added can be adjusted by changing the air gap between the armature and the pole-pieces of relay 18, or by changing the strength of the armature spring.

Actuation of relay 18, as above described, actuates solenoid valve 22 controlling the feed of detergent into the wash tank. If the rate of feed is insufficient to restore the concentration to the predetermined value such as would be the case if the detergent supply were exhausted, or if an unusually large amount of rinse water should flow into the wash tank, the degree of concentration will further decrease with a resulting further increase of anode current through the relay windings. When the anode current thus increased, reaches a predetermined value, relay 19 will also be actuated to close its contacts 32 and 34. Closure of contacts 34 actuates warning signal devices 35 and 36, and any other apparatus which may be connected to terminals 65. If desired, another solenoid valve may be connected to terminals 65, either directly or through a third relay and this valve employed to feed additional detergent into the wash tank in order to hasten the required increase in concentration. Such apparatus is illustrated in Fig. 4.

The circuit of relay 19 is arranged to be self-cycling, viz., to produce intermittent operation, which has been found to be preferable in systems of the type herein described, as well as in many other types. This pulsing action is effected by the parallel connection of condenser 31 and the winding of relay 19 which are shunted by bleeder resistor 33 upon closure of contacts 32. When current flows through the winding of relay 19 a charge is built up on condenser 31. When relay 19 is actuated contacts 32 immediately close. This would immediately deactuate the relay were it not for the charge on condenser 31 which maintains the current through relay 19 until it is bled off through resistor 33. The rate of discharge and hence the basic pulse rate or self-cycling of the relay, is determined by the value of the resistor 33. As a result of this arrangement it will be seen that the actual pulse rate will vary with the charge on condenser 31 which in turn is determined by the current in the anode circuit of tube 17. Consequently, the pulse rate of relay 19 will increase with decrease of solution concentration, so that as the solution becomes weaker the signal devices 35 and 36 will be actuated with increased rapidity, the effect of which is to make the warning signal become more urgent. When the solution concentration becomes very weak, the unbalance of the bridge network will be so great that relay 19 will cease pulsing and will hold up continuously until the conditions are corrected. In the example given, relay 19 will begin to pulse when the solution is, say, 10% below normal concentration, but this point of operation can be adjusted conveniently by adjusting the strength of the armature spring on the relay 19, or by adjusting the air gap between the armature and pole-piece of the relay.

An additional feature of the invention, which is of considerable importance and to which are due many of the advantages above set forth, results from the elements which compensate (or overcompensate) the so-called operating differential of relay 18. It is well known that all relays of the commercial type have an inherent operating differential, sometimes called marginal operation, by which is meant that the relay actuates at a current higher than that at which it deactuates. This differential is usually about 20 percent. For example, a relay which actuates at, say, 10 milliamperes, will not release or deactuate until the current decreases to, say, 8 milliamperes. As a consequence, a control system which includes such a relay cannot be accurate within close limits because, while the initial control action may be substantially instantaneous the relay differential will cause a considerable lag in the deactuation. This defect is present in most control systems; and even in those in which an attempt has been made to compensate the differential action, the improvement has been only partial. This feature of the present invention, is, therefore, not only important to the operation of the apparatus here described, but likewise has valuable application in many other control systems.

As a result of the invention, the operation of the main control relay 18 is stable and positive, and at the same time occurs at exactly the required instants or phases in the control cycle. To this end, closure of contacts 21 and 28 not only actuates the required mechanism such as solenoid valve 22, but also energizes cathode heater 24 of diode 25. When diode 25 begins to conduct, it connects resistors 26 and 27 across the coil of relay 18. These resistors may be of 6800 and 5000 ohms, respectively. If the effective resistance of this shunt circuit is such as to pass about 2 milliamperes, for example, the reduction of current through the relay will cancel the mentioned two-milliampere operating differential. The result is that the relay will drop out even though the anode current remains at 10 milliamperes instead of delaying until that current decreases to 8 milliamperes which would be the case in the absence of the mentioned shunt circuit. If the shunt circuit is adjusted to pass, say, 3 milliamperes, the relay will drop out even though the anode current might increase to 11 milliamperes. This over-compensation of the differential is usually preferred because it provides not only a more positive and sensitive relay action but also an anticipatory control which is of great value. When the relay thus becomes deactuated the heating current to tube 25 is cut off. When the cathode of diode 25 cools to a point where the tube is no longer conductive, no bleeding occurs and the original condition prevails unless the sensing circuit (bridge network) has been brought back to the balanced point and the anode current of amplifier tube 17 has been thereby reduced an appreciable amount.

A second important feature of the controlled bleeder circuit just discussed results from the self-cycling operation thereof, which eliminates any tendency of the control system to "overshoot," or to over-correct the condition in response to which the system operates. First, by adjusting sensitivity control resistor 27 (reducing the resistance) the operating differential may be reduced electrically to a value less than zero (viz., it is overcompensated) during each operating cycle as just described, so that it is possible for the system to detect any decline in solution concentration, then to cause the feed valve to be opened for a short time, such as 10 to 20 seconds, to increase the concentration, and finally, before the system has recovered entirely, the control, by virtue of the self-cycling feature, causes relay 18 to drop out and to close the feed valve. In other words, by virtue of the self-cycling control, the relay is de-energized before it receives a signal from the conductivity cell that the condition has been fully satisfied. The reason that it is important that the control should anticipate the satisfied condition, is that it requires an unavoidable time period for the added detergent to become mixed with the solution in the wash tank and then to influence the conductivity cell. However, this time period will vary under different conditions, for instance, depending on the size of the tank, the time required to dissolve the detergent or other chemicals added to the solution and the facilities for mixing them. The same or corresponding situations prevail in many other control systems, such as in connection with heating, refrigerating and ventilating systems, where there are various delays before the detecting device is sufficiently influenced by the required change in conditions, which usually results in over-correction. In accordance with the invention the magnitude of the required anticipatory factor can readily be selected so as to provide the correct value to compensate exactly for the lag in any particular system.

The desired delay in the self-cycling operation of the controlled bleeder circuit is here attained by the use of a diode 25 of a type which inherently heats slowly and which heating is further delayed by means of a series resistor 39 connected in the heating circuit. In this instance this resistor may be of 1,000 ohms. As a result, tube 25 does not begin to conduct until about 10 seconds have elapsed. If resistor 39 is adjustable, the length of this delay may be preselected. Meanwhile, the detergent has been flowing into the wash tank. Under normal conditions the relay will drop out again within a period of 10 to 20 seconds due to decrease in relay current caused by bleeding action through tube 25 which is now conductive.

During the next 30 to 50 seconds after the relay drops out, the cathode of diode 25 slowly cools because its heater circuit is no longer energized. As a result, the amount of current shunted from relay 18 through diode 25 gradually decreases to zero, thus allowing condenser 20 to recharge and current through coil of relay 18 to reach the threshold value, at which time the system is "peaked" again ready for the next cycle.

During this 30 to 50 seconds waiting period, the new detergent material will have had sufficient time to become thoroughly dissolved and mixed into the wash solution. The complete cycle as above described normally requires about one minute with the apparatus here specifically mentioned.

If the amount of detergent thus added is sufficient to bring the solution back to the proper concentration, the feeding relay 18 will remain open and no further addition will be made until the detergent concentration is again decreased. If, however, the amount of detergent added in this short feeding period has been insufficient to bring the solution up to the proper strength the feeding relay 18 will close as soon as it is "peaked" and detergent will again be added for a short period of time. This cycling will continue as long as dilution occurs, but the ratio of "on" to "off" intervals will change automatically depending on the degree of dilution.

The manner of operation by which the mentioned over-compensation is effected so that the system effectively anticipates the normal control point, will be better understood from the following example:

Assuming that the bleeder circuit diode 25 has an anode-to-cathode resistance which varies between infinity and approximately 2,000 ohms, and also assuming, as above mentioned, that the resistance of the actuating coil of relay 18 is about 2,500 ohms, the bleeder circuit shunted across that coil may vary from infinity when the cathode is cold to about 6,000 or 8,000 ohms when the cathode is heated to its normal operating temperature. Inasmuch as the conductance of this bleeder circuit is dependent upon the cathode temperature, the change in the bleeder current during each control cycle follows roughly the asymptotic curve of a thermocycle. Consequently, the bleeder current approaches maximum value quite slowly and similarly approaches zero value slowly. Under these circumstances, the exact time when relay 18 will close or open again will be governed by the relationship of the magnitude of the total anode current of tube 17 to the peak values (high and low) of the bleeder circuit current, and the time intervals required to effect these values.

To illustrate, if it be assumed, for example, that the automatic control of the detergent be rendered ineffective as by disconnecting solenoid valve 22 of Fig. 1, and that the solution concentration is at a value above normal operating level for which the control system as a whole has been adjusted, the result will be that the anode current of tube 17 will be reduced to a point at which relay 18 will no longer close, or pull in, even though the resistance of the bleeder circuit approaches infinity. This condition of the bleeder circuit places the system in what has been termed "peaked" sensitivity. If, now, the solution concentration be manually reduced very slightly to the normal operating level, relay 18 will close, or pull in, immediately, and even though the concentration remains unchanged, the relay will again drop out as soon as the bleeder circuit shunts off the required current (here of 2 milliamperes), which may require approximately 10 seconds. Thus, even though the cathode of the diode does not reach maximum temperature during this short period of time, a relatively long period of time will be required for the cathode to cool to a point at which it no longer conducts and at which the relay is again rendered operative. This longer period may be approximately 50 to 60 seconds. From the foregoing it will be seen that diode 25 is in effect a delayed action switching device.

If the solution concentration be still further reduced to a value slightly less than the mentioned normal operating level, the anode current of tube 17 will be appreciably increased, as a result of which a longer time, perhaps 15 to 20 seconds, will be required for the cathode of the diode to reach a temperature high enough to permit the diode to conduct 2 milliamperes plus the equivalent of the increase of anode current of tube 17 (which may amount to, say, 3 milliamperes in all) in order to permit the relay again to drop out, or become deactuated. From this it is evident that even though the diode cathode temperature reached a much higher value in the latter instance, it will cool initially at a relatively high rate and rapidly reach a temperature at which the current shunted from relay 18 is reduced to a value permitting the relay again to pull in, even though the diode be still conducting a small amount of bleeder current. In the described example this latter period might comprise 40 to 50 seconds. The duration of the heating cycle of the subsequent operation will remain substantially the same in spite of the fact that under the described conditions the heater of the diode would not be entirely cold at the beginning of such subsequent cycle.

As the solution concentration is still further reduced, the "time on" will be further increased and the "time off" further decreased, until a value of concentration is reached at which the maximum bleeding current (in this case assumed to be 3 milliamperes) is insufficient to bypass the anode current to a value below that which will hold relay 18 closed. This condition may be termed the "lock-in" condition. In one commercial embodiment of the invention the variation of "time on" to "time off" ranged from 20 seconds "on" to 30 seconds "off" at a solution concentration just above that effecting "lock in," and at the other extreme the variation ranged from 10 seconds "on" to 50 seconds "off" at a concentration just below that effecting "lock-out." Thus the system of the present invention provides a control which anticipates the demand and therefore anticipates the normal control point.

Although the type 117Z3 diode has proved to be an economical and effective device by which the mentioned bleeder and delay operations are achieved, the invention is not limited to such device because it may be replaced by other types of delayed-action relays and switching devices, such as thermal relays and other apparatus known in the art.

The modification illustrated in the circuit diagram of Fig. 2 is basically similar to that of Fig. 1, and corresponding circuit elements in the two figures are similarly numbered. The bridge network portion is omitted from the drawing because it may be assumed to be identical with that of Fig. 1. The system of this arrangement differs from that of Fig. 1 chiefly in that it includes a third and auxiliary relay 41 having contacts 42 and 43. Relay 41 may be of a type similar to that of the other relays and, as before, the winding thereof is shunted by a condenser 44 which may be similar to condensers 20 and 31. By adjusting the spring or the air gap of this relay it may be caused to be actuated when the bridge network becomes, for example, more unbalanced than is required to actuate relay 18. Under these circumstances if an auxiliary solenoid valve 45 be connected so as to be energized by closure of contacts 42, 43, an auxiliary source 68 of detergent may be fed to the wash tank. Indicating lamp 46 connected in the circuit of solenoid 45 will indicate operation of solenoid valve 45 or any other equipment which might be substituted for or added to valve 45. If desired, additional auxiliary relays and equipment may be similarly connected to be operated simultaneously or in succession as may be required. Furthermore, and as explained in connection with Fig. 1, additional indicating or other elements may be connected to terminals 65 under the control of relay 19.

*Operation of Figure 2*

In the illustrated example, wherein it is assumed that the system of Fig. 2 is to be used for the control of solution concentration in a dishwashing machine, the operation is briefly as follows:

When the bridge network coupled to transformer 11 is balanced, the control apparatus is in standby position, but when the bridge becomes slightly unbalanced due to dilution of the solution, increased current flows in the anode circuit of tube 17 and thus through windings of relays 18, 41 and 19 which are connected in series in the anode circuit. Due to the relative adjustments of the relays, relay 18 will operate first to add detergent to the wash tank. This relay, being connected in a self-cycling circuit also arranged to compensate for the relay differential, as previously explained, will provide accurate and fine control of the solution concentration. However, if the rate of feeding of detergent is insufficient, the bridge will become more unbalanced and the anode current of tube 17 further increased, which will cause the actuation of relay 41. Operation of this second relay will increase the feed rate of detergent, and if the conditions are satisfied, relay 41 will open before relay 18 because it is adjusted to operate on a higher current value. Ordinarily the self-cycling and differential-compensating refinements are not required in the circuit of relay 41, but could be provided if desired. In the event that the actuation of relay 41 still fails to meet the demand as called for by the unbalanced condition of the bridge network as would be the case if both detergent supplies were exhausted, relay 19 will be actuated and, as in the case of Fig. 1, will give warning signals audible from buzzer 35 and visible from lamp 36, or otherwise, as previously suggested.

Figure 3

The auxiliary control circuit illustrated in Fig. 3 is adapted to be connected to the terminals 65 associated with relay 19 of Fig. 1. This auxiliary circuit includes a relay 47 which may be of the time-delay type, such as a thermal or dash-pot relay. To the output or contact circuit of this relay, additional signalling devices such as buzzer 48 and lamp 49 may be connected, and also a larger power-control relay 50. Energy for the actuation of devices 48, 49 and 50 is derived from step-down transformer 51 connected, as shown, to the power line. Contacts 52 of relay 50 disconnect the motor 53 from the power line when opened. If motor 53 is the motor which operates the washing machine above referred to (or any other controlled device which requires a comparable power source) such machine will be shut down when relay 47 is actuated. Thus, in the mentioned example, when relay 19 of Fig. 1 is actuated, relay 47 will operate later, depending upon the adjustment of its time delay. Upon operation of relay 47, signals 48 and 49 will operate and motor 53 will be disconnected immediately upon actuation of relay 50. In this manner the machine will be automatically shut down in the event that the warning signals have been ignored and the apparatus theretofore actuated has failed to correct the indicated condition. Instead of controlling the power motor as above described, the auxiliary system of Fig. 3 can as well be employed for some other purpose, such as to operate an auxiliary feeding mechanism, as by opening an auxiliary feed valve to supplement the valve 22 of Fig. 1, or to operate a dry detergent feed mechanism which feeds dry detergent directly into the machine, or into a detergent solution feed vat from which the solenoid valve 22 might control the feed.

Instead of employing a relay 47 of the time-delay type above mentioned, an equivalent result may be secured by the use of other apparatus known in the art. For example, the device 47 might comprise one which is actuated as the result of energy accumulated from the intermittent or pulse signals in the circuit of contacts 34 of relay 19 in Fig. 1 or Fig. 2.

Figure 4

Some of the electrical circuit elements of Fig. 1 can be replaced by mechanical elements having equivalent functions, such as shown in the alternative modification illustrated in Fig. 4, wherein the self-cycling and pulsing operations of the earlier figures are effected by suitable cam-switch mechanisms. As before, the elements of the systems of the previous figures which are the same as those of Fig. 4 are designated by the same reference characters.

The self-cycling function associated with relay 18 of Fig. 1 is, in the arrangement of Fig. 4, effected by cam 54 and cam contacts 55. When cam 54 is rotated by cam motor 56 at a speed to provide one cycle or one closure of contacts 55 per minute, for example, the winding of relay 18, together with condenser 20 in parallel with it, will be shunted by variable resistor 57 once per minute. The length of time that resistor 57 is connected in shunt to circuit elements 18 and 20 is determined by the length of the cam 54 which can be selected as required. Reactance 58 connected in series between motor 56 and the line, diagrammatically represents a suitable motor speed control device. By employing a one-cycle-per-minute cam 54 of suitable length, approximately the same time delay and the same operation of the circuit will be secured as in the case of that of Fig. 1 above described, except that the time "on" to "off" ratio will not change automatically.

The second cam, 59, may be shaped so as to provide from, say, 30 to 120 cycles or pulses per minute. A value of about 60 pulses per minute would be a useful average. Cams 54 and 59 may be driven by the same motor, as shown, or by different motors of which the speeds are individually controlled. Whenever relay 19 is actuated, closure of cam contacts 60 will connect variable resistor 61 in shunt with the coil of relay 19 and condenser 31 as in the case of resistor 33 of Fig. 1. As a result of this periodical shunting, relay contacts 32, 34 will open and close at the cam rate, viz., 60 times per minute in this example. The resulting pulses will be uniformly timed and the pulse rate will not increase with increase of anode current in the anode circuit of tube 17, as is the case in the systems of Figs. 1 and 2. The step-down transformer 62 comprises a suitable source of low-voltage power to actuate signal devices 35, 36 and 64 and solenoid valve 63, which corresponds to the second solenoid valve 45 of Fig. 2, although it may be in addition thereto. Valve 63 here controls the flow of detergent from source 69.

Figure 5

As explained above, the principles of the invention are applicable to various types of control systems, and, as an example, Fig. 5 is included to illustrate such application to temperature control. For this purpose a bridge network 70 is connected to the primary 10 of output transformer 11, as in the preceding figures. Corresponding circuit elements in all of the figures are given the same reference characters. The four arms of the bridge comprise inductance arms $L_3$ and $L_4$ and resistance arms 71 and 72. Potentiometer 73 connected between resistances 71 and 72 comprises a control point adjuster which functionally corresponds to titration control potentiometer 16 of Fig. 1. It will be seen that the power supply L₁—L₂ is connected across one pair of conjugate points of the bridge and that the primary 10 of the bridge output transformer 11 is connected across the other pair of conjugate points of the bridge.

In the present example, a detecting device, here temperature bulb 74, replaces the conductivity cell 9 of Fig. 1, this temperature bulb being coupled to the bridge in the same manner that cell 9 is coupled, viz., by a compensating transformer 3, as before. Temperature bulb 74 or its equivalent may be of any suitable type common in the art of temperature measurements, and comprises the temperature-sensitive element in response to which the entire control system is actuated.

Arm L₄ of the bridge comprises the primary winding of a transformer 75 having a secondary winding 76. Connected in series with secondary 76 are shown two resistors 77 and 78. Resistor 78 is here represented as comprising a compensator of which the function is to measure or respond to ambient temperatures. For this purpose the compensator should have a temperature coefficient of resistance of opposite characteristics to those of the temperature measuring bulb 74. In this manner the control may be compensated for radical changes in ambient temperatures and thus correct for a lag effect which might otherwise occur. If the compensator be inserted in the bridge arm in which resistor 72 is shown it may have a temperature coefficient of resistance of the same characteristics as those of the temperature measuring bulb 74. Whether the compensator should be connected directly in a given arm or effectively connected by means of inductive coupling will depend upon the nature of the reactances of the other arms, in accordance with principles well understood in the art. For example, if the bridge 70 be designed for operation on direct current, rather than on alternating current as shown, all of the arms could be resistive.

The modification of the invention resulting from the combination of the sensing circuit of Fig. 5 with the control systems of any of the other figures would be obvious. It would also be obvious that in such temperature control systems, other suitable changes would be made as required. For example, the solenoid valves 22, 45 and 63 in the other figures would be employed to control the flow of oil, gas, or other fuel, or the flow of refrigerant. On the other hand, these valves might be replaced by relays or other apparatus to control the operation of compressor or blower motors, coal stokers, or other desired equipment consistent with the purpose of the system. It will be evident that the previously described advantages resulting from the compensation and overcompensation, as well as the other features of the invention, apply similarly regardless of the nature or the function of the condition which is to be detected, measured and controlled.

We claim:

1. A coupling circuit adapted to couple a detecting device to a control circuit, the output of said device being subject to substantial impedance variations, and said control circuit having a fixed impedance input, said coupling circuit comprising four arms connected in bridge formation, a first arm including impedance compensating means and a detecting device which is sensitive to first and second ambient conditions in a medium, a second arm including a circuit element sensitive to substantially only the second of said conditions in said medium, said element being adapted to balance the effect on said device of said second condition, means for subjecting said device and said element to the influence of said medium, a third and a fourth arm including impedances, means for connecting one pair of conjugate points of the bridge to a source of power, and means for connecting a second pair of conjugate points of the bridge to a control circuit.

2. A coupling circuit according to claim 1 in which said impedance compensating means comprises a transformer having a secondary-to-primary turns ratio of adjustable value which compensates predominately capacitive reactance of said device and maintains high sensitivity of said control circuit over a wide range of impedance variation of said device.

3. A coupling circuit adapted to couple a detecting device to a control circuit, said device being of the type sensitive to an ambient condition in a medium to be detected and controlled, the output of said device being subject to substantial impedance variations, and said control circuit having a fixed impedance input, said coupling circuit comprising four arms connected in bridge formation, an impedance-compensating transformer connected in a first arm of said bridge, said transformer having primary and secondary windings of which the primary is connected in said first arm, means for connecting said device to said secondary, means for adjusting the secondary-to-primary impedance ratio of said transformer windings, a second arm of said bridge including an impedance of character and magnitude proportioned to balance said first arm at a preselected value of said condition, similar impedances comprising the third and fourth arms of said bridge, means for connecting a first pair of conjugate points of the bridge to a power source, and means for connecting the second pair of conjugate points of said bridge to a control circuit.

4. A coupling circuit according to claim 3 characterized in that said transformer has a secondary-to-primary step-down ratio of adjustable value which compensates predominately capacitive reactance of said device and maintains high sensitivity of said control circuit over a wide range of impedance variation of said device.

5. A coupling circuit according to claim 3 characterized in being adapted to couple to a control circuit a detecting device which is sensitive to two ambient conditions, said coupling circuit including in said second arm an element sensitive to only said second ambient condition in the medium, and being adapted to balance the effect on said device of said second condition.

6. A coupling circuit according to claim 3 in which said third and fourth arms comprise the secondary winding of a power transformer, the terminals of said winding being connected to said first pair of conjugate points of the bridge, a potentiometer connected across a plurality of central turns of said winding, a coupling element connected between the adjustable element of said potentiometer and one of said second pair of conjugate points, and means for connecting said coupling element to the input of said control circuit.

7. In a system for the detection and control of a first of two ambient conditions in a medium, wherein both conditions are detected by a device of which the output impedance is subject to considerable variation, and wherein said first condition of the medium is controlled by a control system of which the input impedance is substantially constant, the improvement which comprises, a compensating coupling circuit including four arms connected in bridge formation, a first arm including a detecting device which is sensitive to both ambient conditions in the medium, coupling means for connecting said device in said first arm, said coupling means including variable impedance means for adapting said device to different ranges of said first condition, a second arm including a detecting element sensitive to substantially only the second of said conditions in the medium, said element being adapted to balance the effect on said device of the second condition, means subjecting said device and said element to the influence of said conditions, third and fourth impedance arms, means connecting said third and fourth arms to a first pair of conjugate points of the bridge, means coupling said third and fourth arms to a power source, and means coupling the input of said control system to the second pair of conjugate points of the bridge.

8. In combination, a detecting device responsive to changes in the concentration and temperature of a solution, the output of said device being subject to substantial impedance variations with solutions of different characteristics, a control circuit adapted to control solution concentration and having a fixed impedance input, and a coupling circuit adapted to couple said device to said control circuit, said coupling circuit comprising four arms connected in bridge formation, an impedance-compensating transformer connected in a first arm of said bridge, said transformer having primary and secondary windings of which the primary is connected in said first arm and of which the secondary comprises an adjustable inductance, means for connecting said device to said adjustable inductance, a second arm of said bridge including a circuit component of which the impedance varies as a function of temperature, said component comprising a portion of said detecting device so as to be influenced by the solution temperature and being adapted to balance the effect on said device of changes in solution temperature, third and fourth arms comprising impedance elements, means connecting said impedance elements to a first pair of conjugate points of the bridge, means for coupling said impedance elements to a power source, a titration control comprising a potentiometer connected to at least a portion of said impedance elements, an adjustable element for said potentiometer, output coupling means connected to the fixed impedance input of said control circuit, and means connecting said output coupling means between the adjustable element of said potentiometer and one of the second pair of conjugate points of said bridge.

9. A combination in accordance with claim 8 in which said impedance-compensating transformer includes a tapped secondary winding and means for connecting the detecting device between one terminal of the secondary winding and a selected one of the taps thereof.

GEORGE L. BORELL.
MARCUS I. NYSTUEN.

REFERENCES CITED

The following references are of record in the file of this patent:

UNITED STATES PATENTS

| Number | Name | Date |
|---|---|---|
| 2,176,471 | Pyle | Oct. 17, 1939 |
| 2,214,572 | Bernstein | Sept. 10, 1940 |
| 2,221,306 | Christie | Nov. 12, 1940 |
| 2,265,512 | Brown et al. | Dec. 9, 1941 |
| 2,275,368 | Krause | Mar. 3, 1942 |
| 2,357,745 | Kliever | Sept. 5, 1944 |
| 2,362,661 | Peters | Nov. 14, 1944 |
| 2,366,500 | Eastin | Jan. 2, 1945 |
| 2,377,363 | Noble | June 5, 1945 |
| 2,377,596 | Williams | June 5, 1945 |
| 2,441,348 | Ducret | May 11, 1948 |
| 2,443,122 | Smith | June 8, 1948 |
| 2,483,678 | Switzer | Oct. 4, 1949 |
| 2,525,016 | Borell | Oct. 10, 1950 |